March 5, 1957     D. McC. CURRY     2,784,020
DEVICE FOR REVEALING UNLAWFUL REMOVAL
OF AUTOMOBILE LICENSE PLATES
Filed Jan. 18, 1954
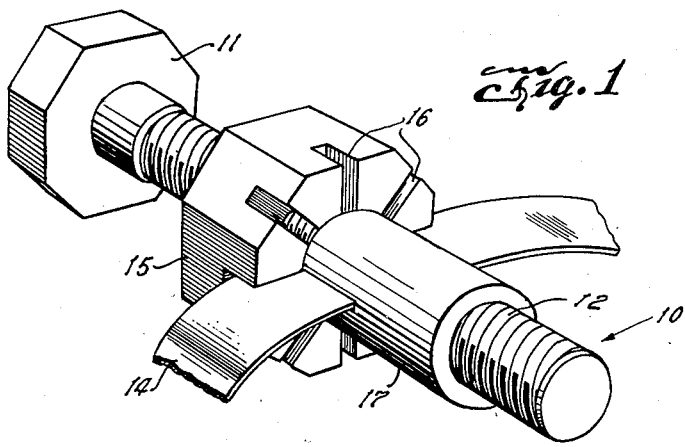
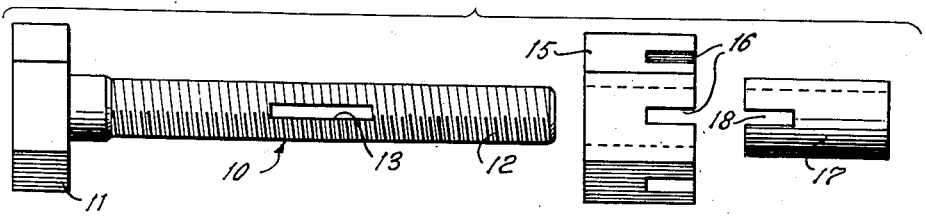
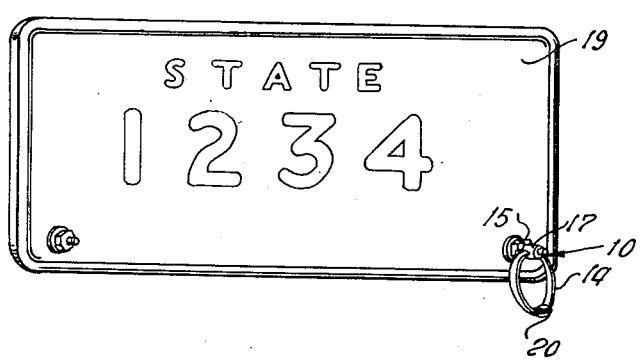
Dorothy McCord Curry
INVENTOR.
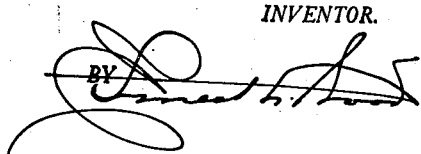
ATTORNEY

United States Patent Office 2,784,020
Patented Mar. 5, 1957

2,784,020

DEVICE FOR REVEALING UNLAWFUL REMOVAL OF AUTOMOBILE LICENSE PLATES

Dorothy McCord Curry, Dallas, Tex.

Application January 18, 1954, Serial No. 404,443

2 Claims. (Cl. 292—327)

This invention relates to an attachment for automobile license plates to detect unauthorized removal or transfer thereof and more particularly to such devices having seals for revealing efforts to remove license plates from automobiles.

It is the principal object of the invention to discourage tampering with automobile license plates or tags for unlawful purposes by persons seeking to change the identity of an automobile for various and usually illegal reasons. With this in view, the invention provides a simple bolt and nut combination especially designed to jointly receive and hold a metal strap having its ends secured together by a seal of malleable metal whose removal or replacement can be readily detected, thus revealing a change or an attempted change of the license plate.

Another object of the invention is to provide a device for preventing undetected tampering of automobile license plates which is both simple and economical and easily applied and further serves as an auxiliary means for fastening a license plate to an automobile.

Other objects will appear as the description proceeds when considered with the annexed drawing, wherein:

Figure 1 is a perspective view of the invention.

Figure 2 is an exploded view of the parts of the invention in elevation, and

Figure 3 is a perspective view of an automobile license showing the invention in place thereon.

Continuing with a more detailed description of the drawing, reference numeral 10 denotes generally a bolt having a head 11 and a threaded portion 12. The head 11 may be of hexagonal shape as shown or designed for the application of a screw driver.

Intermediate the ends of the threaded section 12 of the bolt, an elongate slot 13 is made diametrically therethrough to receive a metal strap 14. Threaded onto the bolt is a nut 15 which has a series of radial slots 16 therein originating in the face of the nut confronting the free end of the threaded section 12 of the bolt. Also threaded onto the section 12 of the bolt is a sleeve 17 having a diametrical slot 18 originating in the end thereof confronting the slotted face of the nut 15.

The length of the slot 13 of the bolt 10 is substantially equal to the combined depths of the slots of said nut 15 and the sleeve 17 and the width of the strap 14 is substantially equal to the length of the slot 13 of the bolt and the combined depths of the slots of the nut and sleeve.

The bolt 10 is first inserted into one of the openings in a license plate 19 provided with conventional screws or bolts for securing the plate to its bracket. The bolt 10 replaces one of the conventional bolts and receives the nut 15 which is tightened against the outer face of the license plate 19. The sleeve 17 is then threaded onto the threaded section 12 of the bolt and is advanced tightly against the slotted face of the nut 15, with its slot 18 in register with a selected transverse slot 16 of the nut so that the metal strap 14 may be passed jointly through the slots of the nut and sleeve and the slot 13 of the bolt 10. The free ends of the strap 14 are then brought together and secured by a metal seal 20 which is applied in molten form in a mold.

It is clearly evident from the foregoing that neither the nut 15 nor the sleeve 17 can be moved on the bolt 10 due to the presence of the metal strap 14 in the aligned slots of these elements and the slot of the bolt and further, that the strap 14 cannot be removed without detection because of the metal seal 20. Therefore, if there is a suspicion that an automobile bearing a device such as described is one reported stolen or otherwise involved in a controversy, the authorities have only to examine the seal 20 and the tape or strap 14 and thereby determine if the license plate has been tampered with to discover evidence of theft or unlawful use of license plates.

Manifestly, the construction as shown and described is capable of some modification and such modification as may be construed to fall within the scope and meaning of the appended claims is also considered to be within the spirit and intent of the invention.

What is claimed is:

1. In combination with an automobile license plate and its mounting, a device for revealing unlawful removal of said license plate from said mounting comprising a threaded bolt having a head and a longitudinal slot extending diametrically through its threaded portion and adapted to extend through aligned openings in said license plate and said mounting, a nut on the threaded portion of said bolt having a series of radial slots originating in the face thereof opposite said head and alignable selectively with the slot of said bolt, a cylindrical sleeve on the threaded portion of said bolt having a transverse slot originating in the end thereof confronting the slotted face of said nut and alignable with a selected slot of said nut in flush engagement of said nut and sleeve, a metal strap extending through the aligned slots of said nut and sleeve and the slot of said bolt and a malleable metal seal securing the ends of said strap together, the length of the slot of said bolt receiving said strap being substantially equal to the combined depths of the slots of said nut and said sleeve.

2. In combination with an automobile license plate and its mounting, a device for revealing unlawful removal of said license plate from said mounting comprising a threaded bolt having a head and a longitudinal slot extending diametrically through its threaded portion and adapted to extend through aligned openings in said license plate and said mounting, a nut on the threaded portion of said bolt having a series of radial slots originating in the face thereof opposite said head and alignable selectively with the slot of said bolt, a cylindrical sleeve on the threaded portion of said bolt having a transverse slot originating in the end thereof confronting the slotted face of said nut and alignable with a selected slot of said nut in flush engagement of said nut and sleeve, a metal strap extending through the aligned slots of said nut and sleeve and the slot of said bolt and a malleable metal seal securing the ends of said strap together, the width of said strap being substantially equal to the length of the slot of said bolt and the combined depths of the slots of said nut and said sleeve.

References Cited in the file of this patent

UNITED STATES PATENTS

| 467,002 | Daniels | Jan. 12, 1892 |
| 669,840 | Jones et al. | Mar. 12, 1901 |
| 2,071,661 | Schuyler et al. | Feb. 23, 1937 |

FOREIGN PATENTS

| 412,527 | France | May 4, 1910 |